United States Patent
Bhogal

(10) Patent No.: US 7,171,622 B2
(45) Date of Patent: Jan. 30, 2007

(54) METHOD, APPARATUS AND COMPUTER PROGRAM PRODUCT FOR PROJECTING OBJECTS IN A DISPLAY UNIT

(75) Inventor: Kulvir Singh Bhogal, Forth Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 10/199,231

(22) Filed: Jul. 18, 2002

(65) Prior Publication Data

US 2004/0012538 A1   Jan. 22, 2004

(51) Int. Cl.
*G06F 3/00* (2006.01)

(52) U.S. Cl. .................... 715/730; 715/740

(58) Field of Classification Search ............. 715/730, 715/732, 740, 753, 761, 778, 790, 802
See application file for complete search history.

(56) References Cited

U.S. PATENT DOCUMENTS

| | | | |
|---|---|---|---|
| 3,838,525 A | 10/1974 | Harvey | |
| 4,148,073 A | 4/1979 | Slobodzian et al. | |
| 4,467,349 A | 8/1984 | Maloomian | |
| 4,845,634 A | 7/1989 | Vitek et al. | |
| 5,101,197 A | 3/1992 | Hix et al. | |
| 5,187,776 A | 2/1993 | Yanker | |
| 5,422,827 A | 6/1995 | Niehaus | |
| 5,463,726 A * | 10/1995 | Price | 715/797 |
| 5,564,002 A * | 10/1996 | Brown | 715/778 |
| 5,574,572 A | 11/1996 | Malinowski et al. | |
| 5,673,204 A | 9/1997 | Klingelhofer | |
| 5,710,573 A | 1/1998 | Hung et al. | |
| 5,790,714 A | 8/1998 | McNeil et al. | |
| 5,841,435 A * | 11/1998 | Dauerer et al. | 715/775 |
| 5,874,960 A * | 2/1999 | Mairs et al. | 715/733 |

(Continued)

OTHER PUBLICATIONS

Holzman, T.G., "On-line Highlighting and Margin Notes," *IBM Technical Disclosure Bulletin*, vol. 34, No. 10A, Mar. 1992, pp. 481-484.

(Continued)

*Primary Examiner*—Sy D. Luu
(74) *Attorney, Agent, or Firm*—Marilyn S. Dawkins; Anthony V. S. England

(57) ABSTRACT

In a method form of the invention, objects are projected in a first display unit for a computer system. The computer system enables designating one of the objects projected in the first display unit. The designated object is projected in a second display unit communicatively connected to the computer system. The designated object is projected as an active object in one of the display units concurrently with projecting it as a non-active object in the other of the display units.

39 Claims, 7 Drawing Sheets

U.S. PATENT DOCUMENTS

| | | |
|---|---|---|
| 5,898,419 A | 4/1999 | Liu |
| 5,917,480 A * | 6/1999 | Tafoya et al. ............... 715/732 |
| 5,977,966 A * | 11/1999 | Bogdan ..................... 715/800 |
| 6,014,125 A | 1/2000 | Herbert |
| 6,018,340 A * | 1/2000 | Butler et al. ................ 715/764 |
| 6,181,338 B1 * | 1/2001 | Brodhun ..................... 715/798 |
| 6,184,905 B1 | 2/2001 | Hartog |
| 6,226,040 B1 | 5/2001 | Kuo et al. |
| 6,476,873 B1 | 11/2002 | Maeng |
| 6,493,036 B1 | 12/2002 | Fernandez |
| 6,501,441 B1 | 12/2002 | Ludtke et al. |
| 6,552,750 B1 | 4/2003 | Suen et al. |
| 6,710,790 B1 * | 3/2004 | Fagioli ...................... 715/802 |
| 6,808,888 B2 | 10/2004 | Bhogal et al. |
| 6,862,005 B2 * | 3/2005 | Someya ...................... 345/1.1 |
| 2003/0160813 A1 * | 8/2003 | Raju .......................... 345/730 |

OTHER PUBLICATIONS

Baber, R.L., and Pascoe, R.A., "Automated Capture of Multimedia Resources," *IBM Technical Disclosure Bulletin*, vol. 34, No. 11, Apr. 1992, p. 14.

Web Site for "Deuce® HD," http://www.commspecial.com/deuce-hd.html.

* cited by examiner

METHOD, APPARATUS AND COMPUTER PROGRAM PRODUCT FOR PROJECTING OBJECTS IN A DISPLAY UNIT

CROSS-REFERENCE TO RELATED APPLICATION

This application is related to U.S. patent application Ser. No. 10/046,942, filed Jan. 15, 2002, which has inventorship and assignment in common with the present application, and which is hereby incorporated herein by reference.

BACKGROUND

1. Field of the Invention

This invention concerns objects projected in a first display unit coupled to a computer system, and, more particularly, concerns objects manipulated in the first display unit for projecting in a second display unit also communicatively computer system.

2. Related Art

In public speaking, it is common for a presenter to have visual material on his or her computer, which is very often a notebook computer, and to display the material on both the speaker's computer monitor and a larger, audience monitor. Computers, and particularly notebook computers, have improved in recent years with regard to computational power and capability to quickly render high-resolution images. There have also been improvements in size and resolution of monitors included in notebook computers. With these improvements, computers are potentially even more useful for presentations. However, there have not been correspondingly significant improvements in the way that information from the speaker's computer is manipulated for displaying on an audience monitor. Therefore a need exists for such improvements.

SUMMARY

The foregoing need is addressed in the present invention. According to a method form of the invention, objects are projected in a first display unit for a computer system. The computer system enables designating one of the objects projected in the first display unit. The designated object is projected in a second display unit communicatively connected to the computer system. The designated object is projected as an active object in one of the display units concurrently with projecting it as a non-active object in the other of the display units.

In another aspect, the designated object has at least a portion hidden in its first display unit projection. In the second display unit projection the entire designated object is visible.

In another aspect, the enabling of the designation of the object includes providing a button associated with the object.

In still another aspect, the enabling of the designation of the object includes projecting an object manipulation window in the first display unit. Upon being initially opened, the object manipulation window replicates a projection of objects projected in the first display unit.

In yet further aspects, a size for the second display unit projection of the designated object is selected in the object manipulation window. Also, a location for the second display unit projection of the designated object is selected in the object manipulation window.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
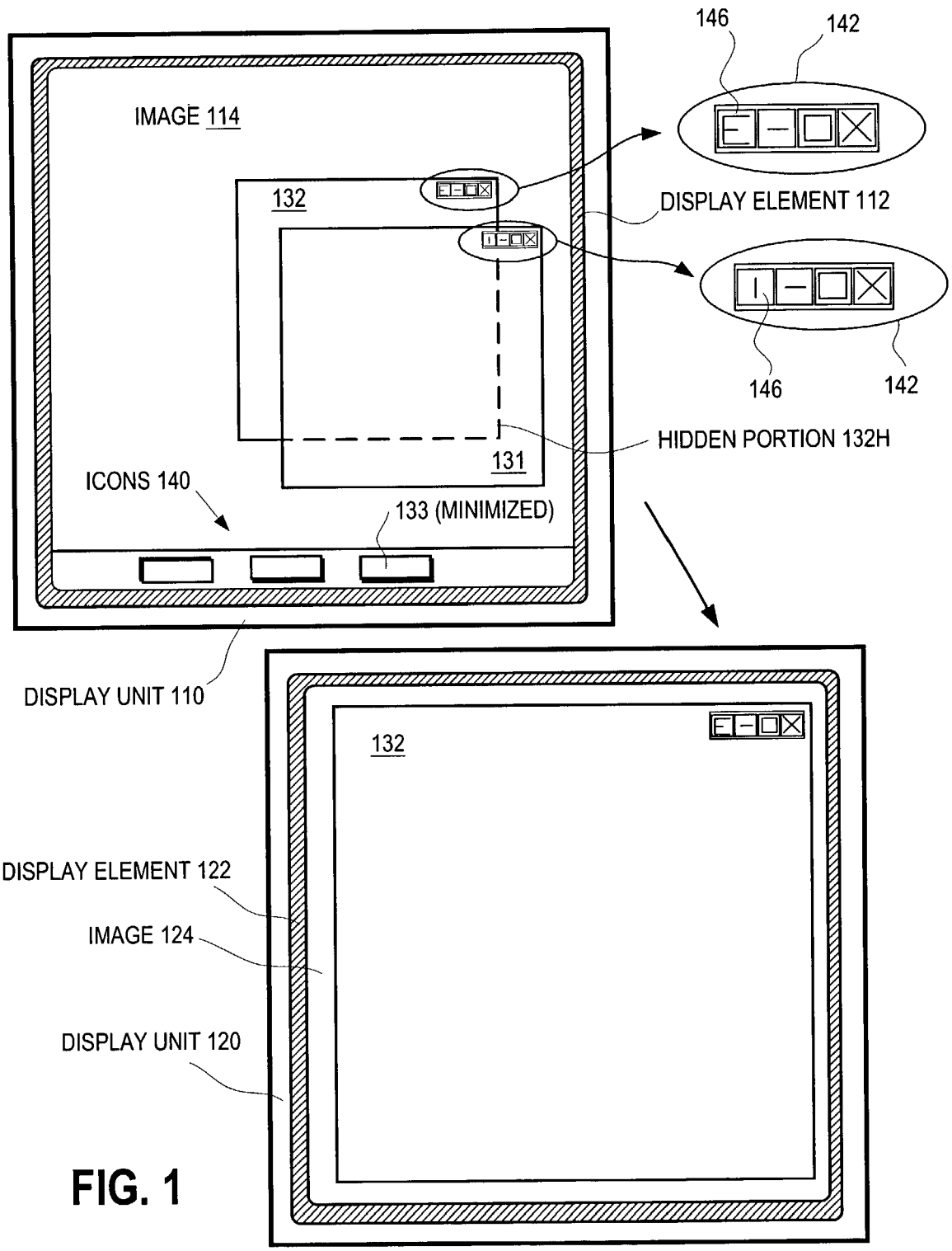
FIG. 1 illustrates objects projected in display units, according to an embodiment of the present invention.

Referring now to FIG. 1, an image 114 is shown projected onto a display element 112 of a display unit 110 (also referred to as a "monitor"). In a typical application, the display unit 110 is used as a monitor for a public speaker connected to a computer system (not shown) and a second display unit 120 is communicatively coupled to the computer system to project an image 124 on display element 122 for viewing by an audience. (Herein, the display unit 110 may also be referred to as an "internal" monitor, and the display unit 120 as an "external" monitor.) The image 114 includes a number of icons 140 which represent active or inactive objects that the computer system is processing. An "object", as the term is used herein, refers to something viewable on a display unit, including an icon or a window. The term "window" refers to an area, usually rectangular, which acts like a separate input/output device under the control of an application program. A window gives a user the ability to see the output of several processes at once and to choose which one will receive input by selecting its window, usually by pointing at it with a mouse.

The term "active" object, in one embodiment herein, refers to an object fully visible on the display unit, such as a window that has been user selected and that is therefore available to receive input. The term "inactive" object, in that same embodiment herein, refers to an object that is at least partly hidden, such as a window that is not the window currently selected for receiving user input. In a broader sense, the term "active" object refers herein to an object, such as a window, which is dynamically updated, whereas the term "inactive" object refers to an object, such as a window, that is at least partly static,. That is, in one respect, the visual projection of such an active object is substantially continuously updated to display results of computations and other changes. On the other hand, computations and other changes may be proceeding more or less continuously for the inactive object, but the visual projection of the inactive object is not updated automatically, or at least not as frequently automatically updated.

Generally speaking, since an active window is visibly dynamic and therefore not hidden, if there is more than one window displayed, the active window is the topmost window visible, or at least among a number of topmost windows. On the other hand, an inactive window may or may not be fully visible. That is, part or all of an inactive window may be hidden so that at least the hidden part is static, or the inactive window may be fully visible but nevertheless static.

The first one of the icons 140 on the left represents active object 131, which is the top window projected in image 114. The middle one of the icons 140 represents non-active object 132, which is the window that is partly behind window 131 as projected in image 114. That is, non-active window 132 has a hidden portion 132H obscured by active window 131. The right hand one of the icons 140 represents a non-active object 133 that is minimized and therefore not otherwise visible in image 114.

As may be seen in FIG. 1, in the upper right-hand corner of non-minimized windows 131 and 132 certain icons 142 are visible in display unit 110. The three right hand ones of the icons 142 are conventional icons which can be selected to minimize, restore, maximize or close their respective windows. A window that is minimized is projected as an icon, in which case all of the window except its iconic representation is hidden. A window that is restored is projected full screen if maximized, or possibly smaller if not maximized. The left hand icon 146 among icons 142 is provided according to the present embodiment for designating that the associated window be projected as an active window in the second display unit 120 even while the window is projected as non-active in display unit 110.

In the instance illustrated in FIG. 1, window 132 is projected as a non-active window in display unit 110, but is concurrently projected in display unit 120 as an active window. Note that in display unit 120 the entire window 132 is projected, including the portion 132H that is hidden in display unit 110. Note also the appearance as an "E" of icon 146 associated with window 132, indicating that window 132 has been designated for projection as active on the external display unit 120. Contrast this to the appearance as an "I" of icon 146 associated with window 131, indicating that window 131 has been designated for projection only on the internal display unit 110.

Figure 2:
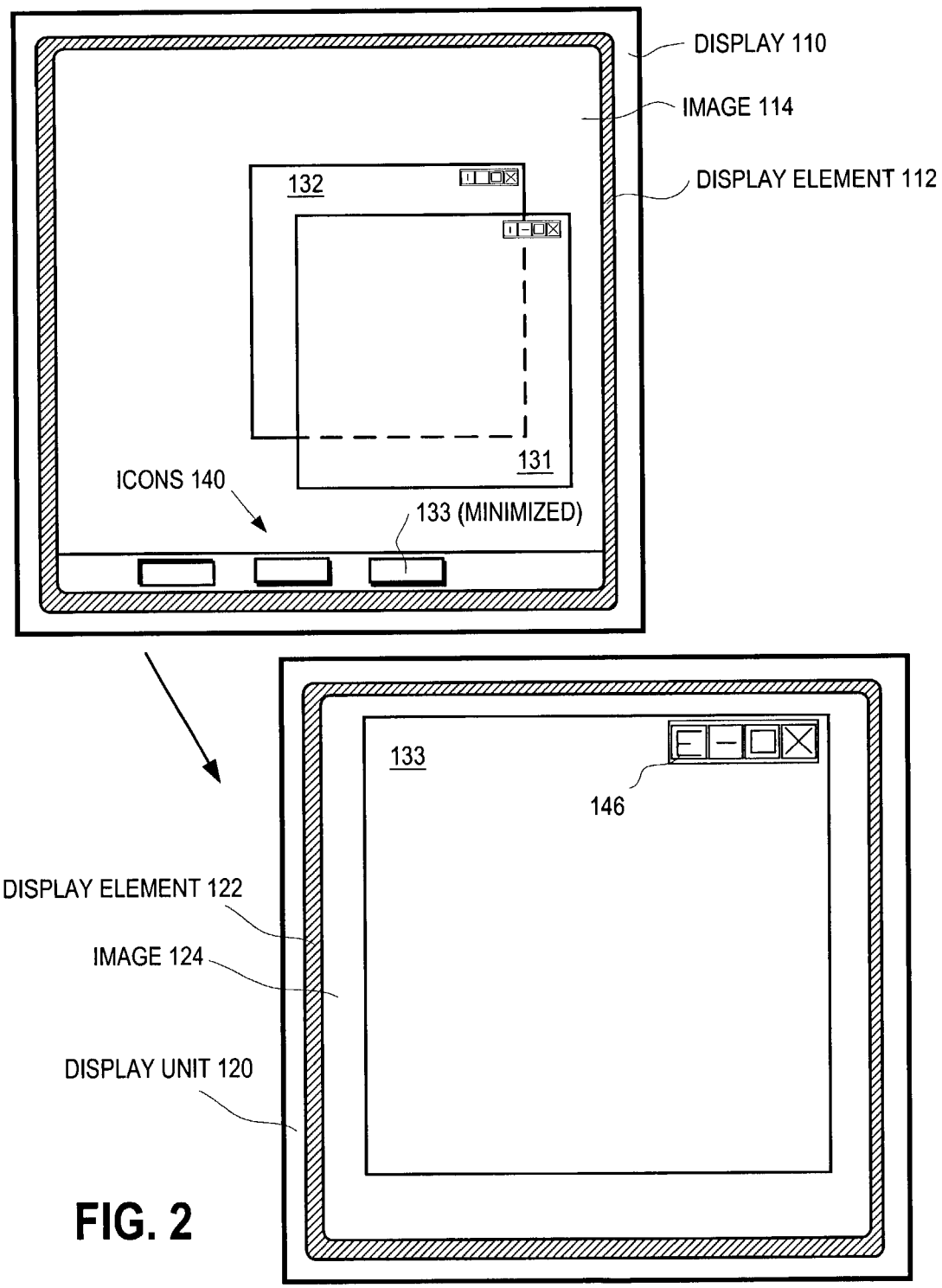
FIG. 2 illustrates another instance of objects projected in display units, according to an embodiment of the present invention.

Referring now to FIG. 2, in the instance illustrated here object 133, which is minimized and therefore non-active in display unit 110, has been selected for projecting as an active window in display unit 122. This may have been done by a user selecting the internal/external icon 146 on display unit 110 while icon 146 was visible when the window 133 was active, that is, before the window 133 was minimized on display unit 110. According to various embodiments, other means are also provided for enabling designation of an object for projecting as an active object on the external display unit 120. One such other means is described in detail in the following.

Figure 3:
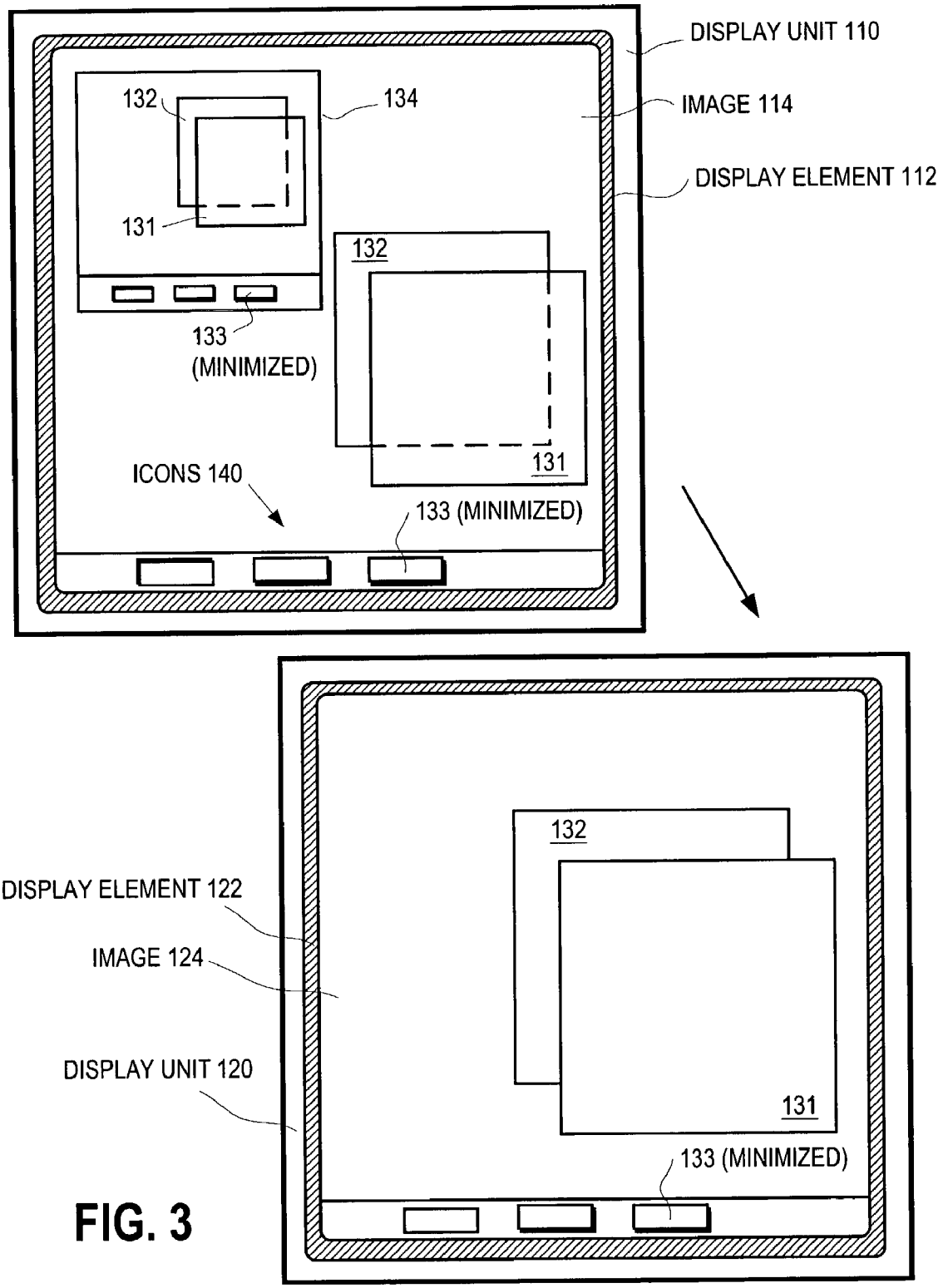
FIG. 3 illustrates another arrangement in which objects are projected in display units, according to an embodiment of the present invention.

Referring now to FIG. 3, another arrangement is shown. According to this embodiment, an object manipulation window 134 is projected in image 114 of the speakers display unit 110 for enabling designation of one or more objects to be projected as active in the external display unit 120. At the moment illustrated in FIG. 3 the object manipulation window 134 has just been opened. Accordingly, the window 134 replicates the other objects projected in image 114 before they have been manipulated in window 134. That is, projected in window 134 at the initial moment illustrated are icons 140 and the non-minimized windows 131 and 132, just as they are projected in display unit 110, disregarding window 134 itself.

Figure 4:
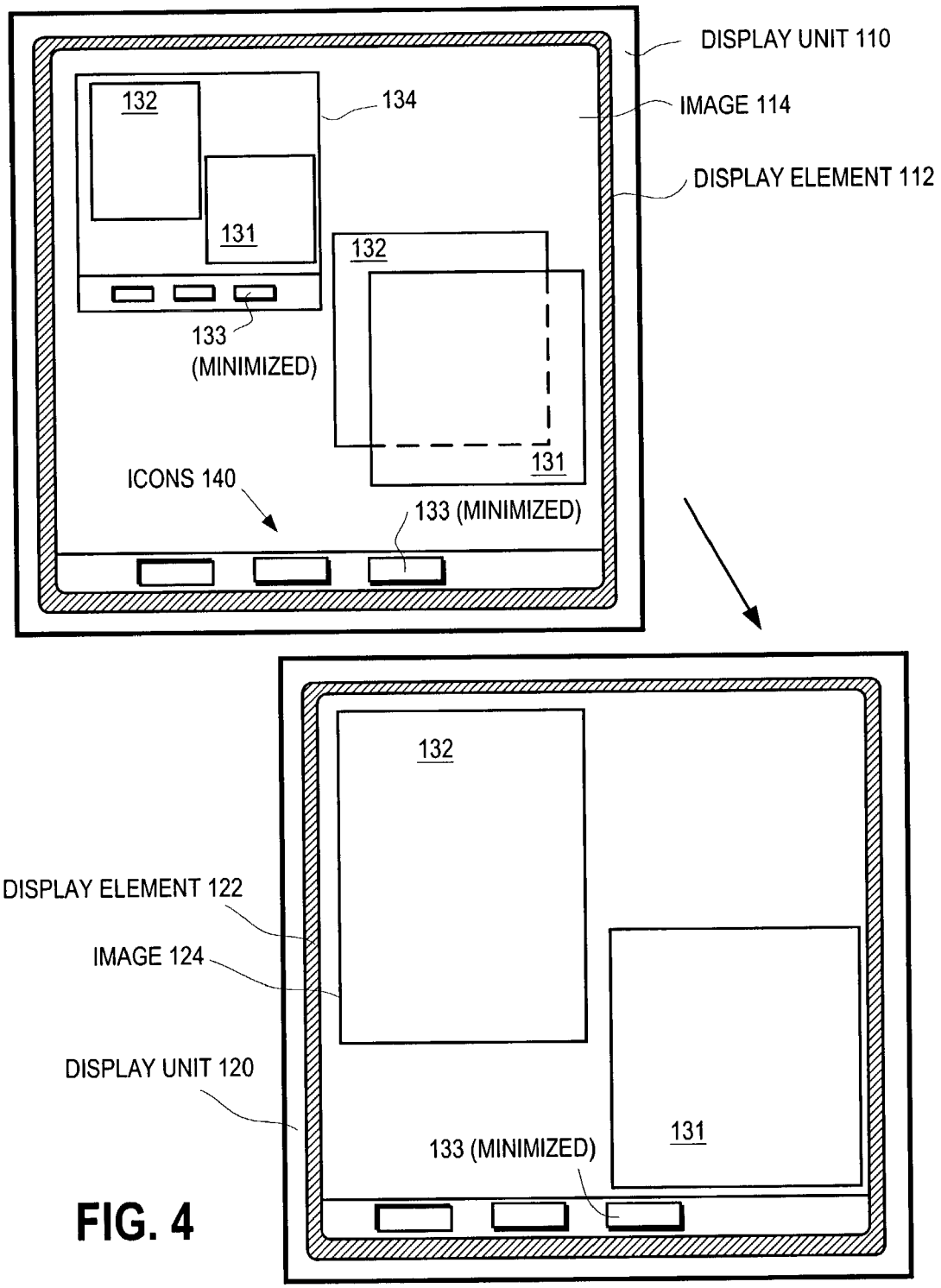
FIG. 4 illustrates another instance of objects projected in display units using the arrangement of FIG. 3, according to an embodiment of the present invention.

Referring now to FIG. 4, an instant is illustrated some time later than that illustrated in FIG. 3. In FIG. 4 windows 131 and 132 have now been manipulated by a user, for example, a speaker who is using display unit 110 to arrange material for presentation to an audience on audience display unit 120. Specifically, window 132 has been relocated from partly behind window 131, and the windows have also been resized so that both windows 131 and 132 are entirely visible in window 134 and, correspondingly, in display unit 120. Note that even though the replicated windows 131 and 132 have changed in window 134 and display unit 120, the original windows 131 and 132 remain unchanged in the rest of image 114 projected in display unit 110.

Using the object manipulation window 134 of the embodiment the relocating is done by merely dragging replicated window 132 using a pointing device. For example, a mouse pointer is placed on the replicated window 132 within window 134 and the right mouse button is pressed and held down while the pointer is moved, which drags the replicated window 132 with the pointer until the button is released, at which time the window is dropped. Likewise, using the object manipulation window 134 of the embodiment the resizing is done by merely dragging a handle on the replicated window 132 using a pointing device. For example, using a mouse the mouse pointer is placed on an edge of replicated window 132 within window 134, and the right mouse button is pressed and held down while the pointer is moved, which drags the edge of the window.

Note that with the object manipulation window 134, objects that are not projected on display unit 110 can be designated for projection on display unit 120, and, conversely, objects that are projected on display unit 110 can be designated not to be projected on display unit 120 without the use of the external/internal icon 146 previously described. This is illustrated now with reference to FIG. 5.

Figure 5:
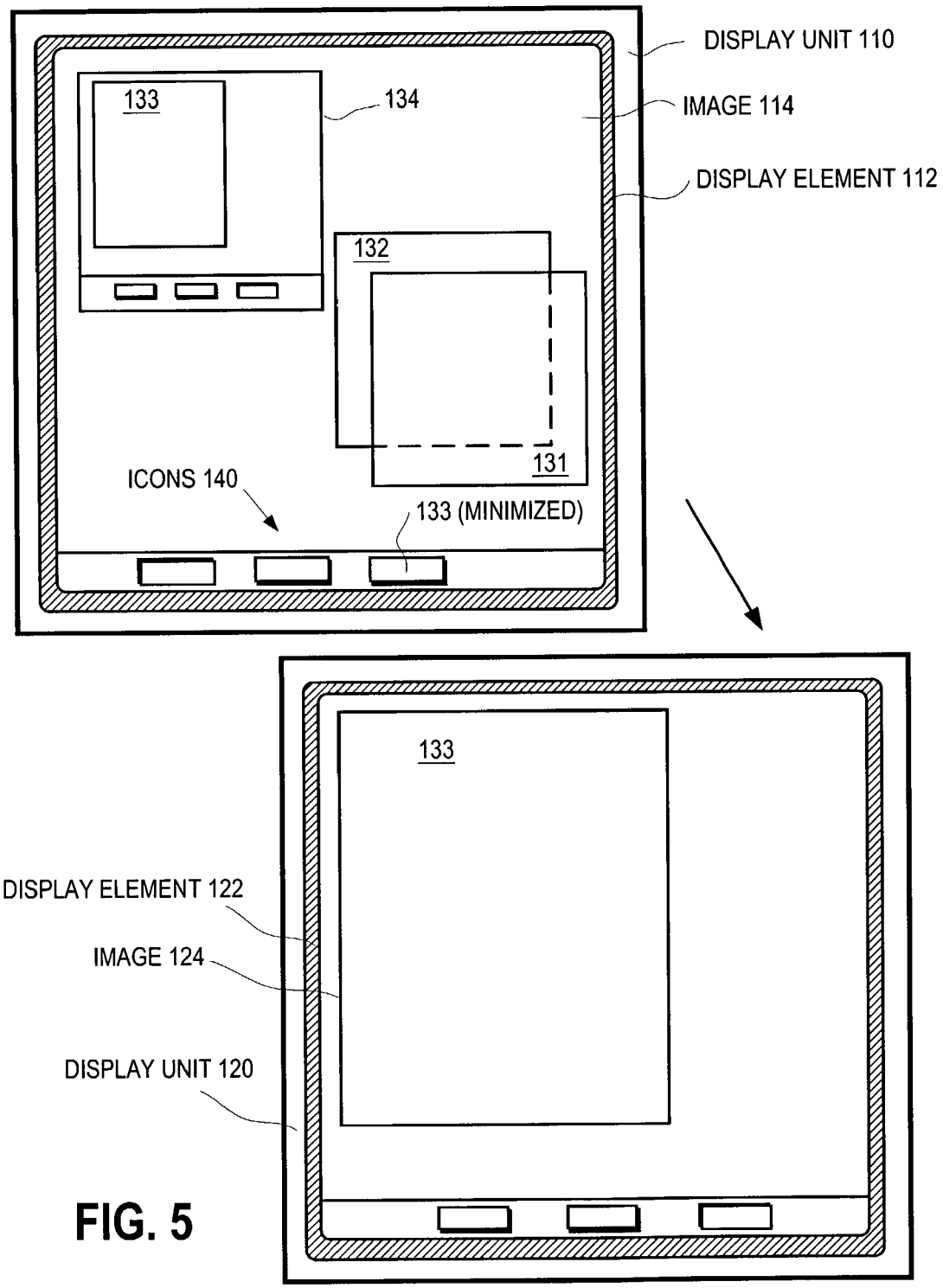
FIG. 5 illustrates still another instance of objects projected in display units using the arrangement of FIG. 3, according to an embodiment of the present invention.

Referring now to FIG. 5, an instant is illustrated after windows 131 and 132 have been minimized and window 133 has been restored in object manipulation window 134. That is, the ones of the icons 142 for minimizing a window have been selected in window 134 for replicated windows 131 and 132. Thus, replicated windows 131 and 132 are minimized in object manipulation window 134 as projected on display unit 110, and, correspondingly, windows 131 and 132 are not projected in display unit 120. Note, however, that windows 131 and 132 remain projected in the rest of the image 114 of display unit 110 outside window 134. Likewise, the one of the icons 140 representing window 133 has been selected in window 134. Thus replicated window 133 is restored in object manipulation window 134 as projected in display unit 110, and, correspondingly, window 133 is projected in display unit 120. However, window 133 is not active nor projected in the rest of image 114 of display unit 110 outside window 134.

Figure 6:
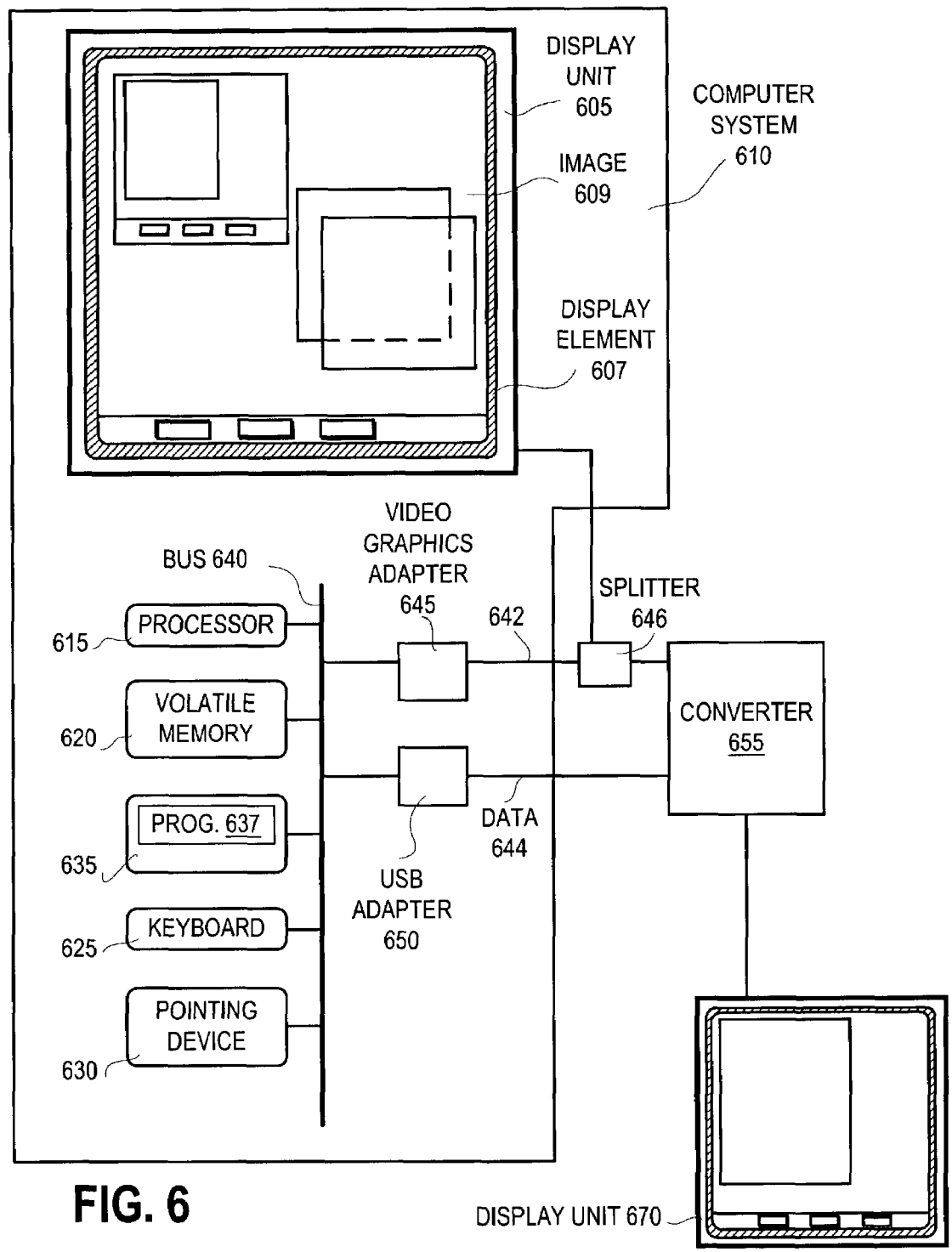
FIG. 6 illustrates a computer system, converter and display units generally applicable for the embodiments described herein.

Referring now to FIG. 6, a computer system 610 is shown that is generally applicable for the embodiments described herein. Computer system 610 has a processor 615, a volatile memory 620 (that is, random access memory, for example), a keyboard 625, a pointing device 630, such as a mouse, trackball, touch pad, etc., a nonvolatile memory 635 (for example, read only memory, hard disk, floppy disk, CD-ROM, etc.), and a display unit 605. The display unit 605 receives a video signal 642 from video graphics adapter 645. The memory 620 and 635 are for storing programs 637 for controlling the processor 615. Processor 615 is operative with the programs 637 to perform as described herein. These components in the system 610 are interconnected by bus 640. The keyboard 625 is a device of the sort that is sometimes referred to as a "data entry" device. In other embodiments, the system 610 includes a data entry device such as a microphone for receiving voice commands, a keypad, etc.

Converter 655 is communicatively coupled to computer system 610. In particular, converter 655 is coupled to the bus 640 via USB 2.0 adapter 650 and is also coupled to a video graphics adapter 645, which, in turn, is coupled to the bus 640. In another embodiment, the converter 655 is coupled to the bus 640 via an IEEE 1394 "Firewire" adapter. Of course it should be understood that in other embodiments the converter is an internal part of the computer system 610.

The converter 655 is operable to receive visual information from the computer system 610, that is, information for projecting a visual image such as image 609 on display element 607 of display unit 605. In the embodiment, visual information for that which is projected on display unit 605 is provided by a video signal 642 output by the video graphics adapter 645 for the computer system 610. A splitter 646 splits the video signal 642 in order to drive both the display unit 605 and the converter 655.

The converter 655 is also operable to receive selection data 644 from the computer system via the USB adapter 650 connection. Selection data 644 identifies at least a first portion of the image 609. The selection data is generated by the program 637 running on the computer system 610, responsive to a user input designating image portions for projecting on one or more external display units, such as display unit 670. As previously described, the image portions may be objects such as windows, including windows that are non-active.

The converter 655 is also operable to receive, from the computer system via the USB adapter 650 connection, visual information for images that are not projected on display unit 605, such as the hidden portion 132H of window 132 shown in FIG. 1. That is, the operating system portion of programs 637 conventionally keeps track of objects, such as tracking which among a number of windows is the top window. According to the present embodiment, the programs 637 also include a function that keeps track of visual information that would have been projected for a designated window if the window had not been hidden and sends selected portions of this information to the converter 655 via the data link 644. The visual information portions sent are for objects designated for projection on one of the external display units.

Figure 7:
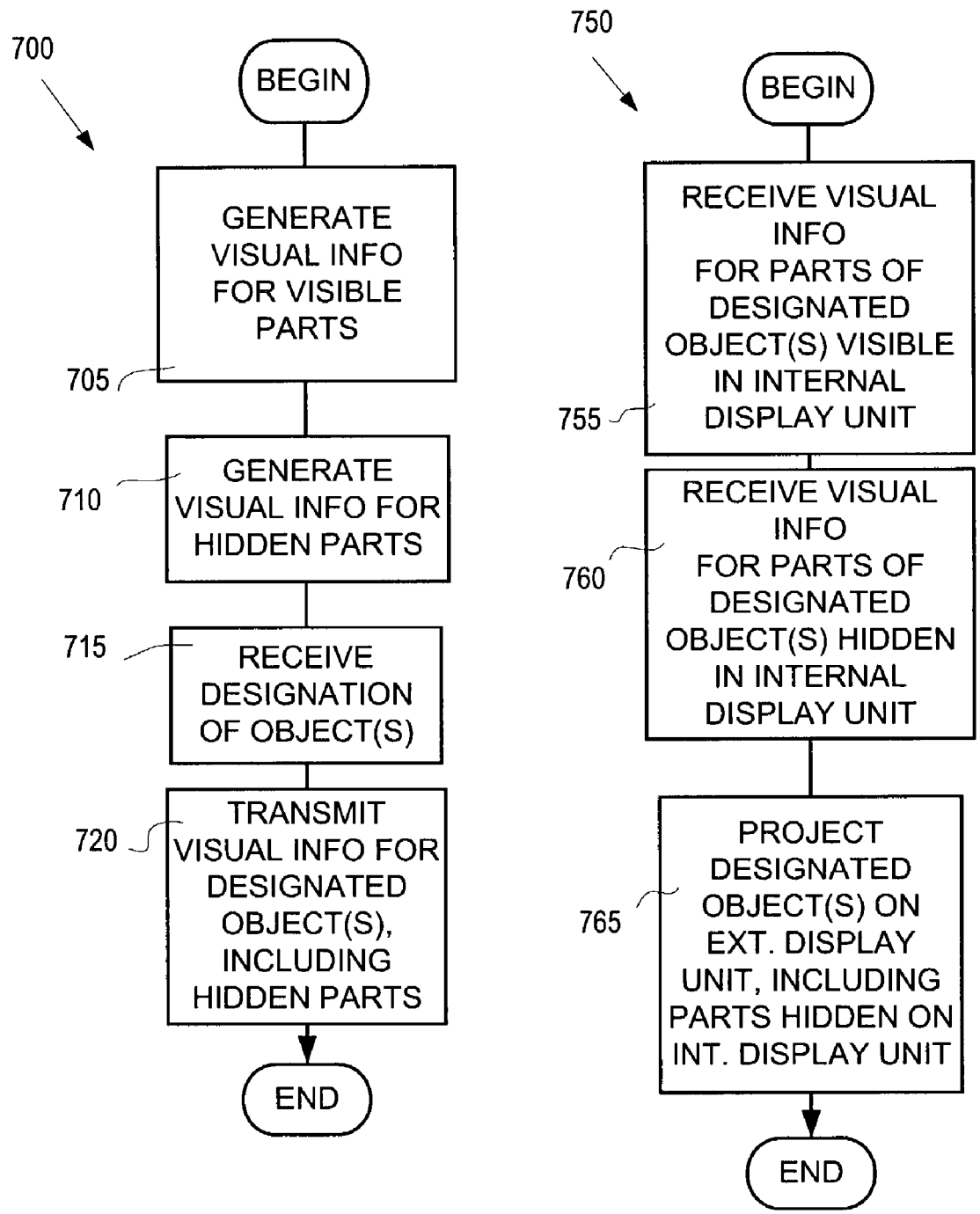
FIG. 7 illustrates a flow chart for certain functions, according to an embodiment.

Referring now to FIG. 7, a flow chart is shown for certain functions, according to an embodiment. Logic 700 is for functions performed by the computer system 610 (FIG. 6). At logic block 705 the system 610 generates visual information for objects and portions of objects that are visible in the image 609 projected in display unit 605 (FIG. 6). At block 710 the computer system 610 generates a visual information for objects and parts of objects that are hidden in the image 609. At block 715 the computer system 610 receives a user initiated designation of an object or objects for projecting in one or more external display units, such as the display unit 670 explicitly shown in FIG. 6. At block 720 the computer system 610 transmits visual information for the designated object or objects, including parts that are hidden in the projection in display unit 605.

Logic 750 is for functions performed by the converter 655 (FIG. 6). In logic block 755 the converter 655 receives visual information for designated objects or parts of designated objects that are visible in the image 609 of internal display unit 605. In block 760 the converter 655 receives visual information for designated objects or parts of designated objects that are hidden in the image 609 of internal display unit 605. In block 765 the converter generates information for projecting the designated object or objects in the one or more external display units, such as the display unit 670.

The description of the present embodiment has been presented for purposes of illustration, but is not intended to be exhaustive or to limit the invention to the form disclosed. Many modifications and variations will be apparent to those of ordinary skill in the art. For example, while certain aspects of the present invention have been described in the context of particular circuitry, those of ordinary skill in the art will appreciate that processes of the present invention are capable of being performed by a processor responsive to stored instructions, and accordingly some or all of the processes may be distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

In various embodiments computer system 610 takes a variety of forms, including a personal computer system, mainframe computer system, workstation, Internet appliance, personal digital assistant ("PDA"), conventional telephone, cell phone, appliance with embedded processor and memory, etc. That is, it should be understood that the term "computer system" is intended to encompass any device having a processor that executes instructions from a memory medium. The memory medium preferably stores instructions (also known as a "software program" or simply "program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

In another variation, although the embodiments described above have focused on selecting an object that is inactive on an internal display unit for projecting as active on an external display unit, it should be understood that in other embodiments an object that is active on the internal display unit is selected for projecting as inactive on the external display unit.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. An apparatus comprising:
   a computer system operable for visibly displaying objects in a first display unit;
   means for enabling a designation of one of the objects;
   means for visibly displaying the designated object as an object in a second display unit communicatively connected to the computer system, wherein the visibly displaying means comprises means for visibly displaying the designated object as an active object in one of the first and second display units concurrently with the designated object being visibly displayed as a non-active object in the other display unit.

2. The apparatus of claim 1, wherein the designated object is visibly displayed as an active object in the second display unit concurrently with the designated object being visibly displayed as a non-active object in the first display unit.

3. The apparatus of claim 2, wherein the designated object being visibly displayed as a non-active object in the first display unit has at least a portion of the designated object hidden in the first display unit projection, and wherein the visibly displaying means comprises means for visibly displaying as visible in the second display unit the at least portion of the designated object that is hidden in the first display unit projection.

4. The apparatus of claim 3, wherein the designated object being visibly displayed as a non-active object in the second display unit is minimized in the first display unit.

5. The apparatus of claim 3, wherein the designated object being visibly displayed as a non-active object in the second display unit is restored in the first display unit.

6. The apparatus of claim 2, wherein the means for enabling the designation of the object comprises means for providing a button associated with the object.

7. The apparatus of claim 6, wherein the button is in the first display unit projection of the designated object.

8. The apparatus of claim 2, wherein the enabling means comprises means for visibly displaying an object manipulation window in the first display unit, wherein upon being initially opened the window replicates a projection of objects visibly displayed in the first display unit.

9. The apparatus of claim 8, wherein the object manipulation window comprises means for selecting a location for the projection of the designated object in the second display unit.

10. The apparatus of claim 1, wherein the designated object is visibly displayed as an active object in the first display unit concurrently with the designated object being visibly displayed as a non-active object in the second display unit.

11. An apparatus comprising:
    a computer system operable for projecting objects in a first display unit;
    means for enabling a designation of one of the objects; and
    means for projecting the designated object as an object in a second display unit communicatively connected to the computer system, wherein the projecting means comprises means for projecting the designated object as an active object in one of the display units concurrently with the designated object being projected as a non-active object in the other display unit, wherein the designated object is projected as an active object in the second display unit concurrently with the designated object being projected as a non-active object in the first display unit, wherein the enabling means comprises means for projecting an object manipulation window in the first display unit, wherein upon being initially opened the window replicates a projection of objects projected in the first display unit, and wherein the object manipulation window comprises means for selecting a size for the projection of the designated object in the second display unit.

12. The apparatus of claim 11, wherein the size selection means comprises means to drag an edge of the designated object in the object manipulation window.

13. An apparatus comprising:
    a computer system operable for projecting objects in a first display unit;
    means for enabling a designation of one of the objects; and
    means for projecting the designated object as an object in a second display unit communicatively connected to the computer system, wherein the projecting means comprises means for projecting the designated object as an active object in one of the display units concurrently with the designated object being projected as a non-active object in the other display unit, wherein the designated object is projected as an active object in the second display unit concurrently with the designated object being projected as a non-active object in the first display unit, wherein the enabling means comprises means for projecting an object manipulation window in the first display unit, wherein upon being initially opened the window replicates a projection of objects projected in the first display unit, wherein the object manipulation window comprises means for selecting a location for the projection of the designated object in the second display unit, and wherein the location selection means comprises means to drag the designated object in the object manipulation window.

14. A method comprising the steps of:
    enabling a designation of a non-active object visibly displayed in a first display unit connected to a first computer system; and
    visibly displaying the designated object as an object in a second display unit communicatively connected to the first computer system, wherein the designated object is visibly displayed as an active object in one of the first and second display units concurrently with the designated object being visibly displayed as a non-active object in the other display unit.

15. The method of claim 14, wherein the designated object is visibly displayed as an active object in the second display unit concurrently with the designated object being visibly displayed as a non-active object in the first display unit.

16. The method of claim 15, wherein the designated object being visibly displayed as a non-active in the first display unit has at least a portion of the designated object hidden in the first display unit projection, and wherein the visibly displaying comprises visibly displaying as visible in the second display unit the at least portion of the designated object that is hidden in the first display unit projection.

17. The method of claim 16, wherein the designated object being visibly displayed as a non-active object in the second display unit is minimized in the first display unit.

18. The method of claim 16, wherein the designated object being visibly displayed as a non-active object in the second display unit is restored in the first display unit.

19. The method of claim 15, wherein the enabling of the designation of the non-active object comprises providing a button associated with the object.

20. The method of claim 19, wherein providing the button comprises displaying the button wit the non-active object in the first display unit.

21. The method of claim 15, wherein the enabling of the designation of the non-active object comprises visibly displaying an object manipulation window in the first display unit, wherein the window replicates a projection of objects visibly displayed in the first display unit.

22. The method of claim 21, wherein the object manipulation window enables selecting a location for the projection of the designated object in the second display unit.

23. The method of claim 14, wherein the designated object is visibly displayed as an active object in the first display unit concurrently with the designated object being visibly displayed as a non-active object in the second display unit.

24. A method comprising the steps of:
enabling a designation of a non-active object projected in a first display unit connected to a first computer system; and
projecting the designated object as an object in a second display unit communicatively connected to the first computer system, wherein the designated object is projected as an active object in one of the display units concurrently with the designated object being projected as a non-active object in the other display unit, wherein the designated object is projected as an active object in the second display unit concurrently with the designated object being projected as a non-active object in the first display unit, wherein the enabling of the designation of the non-active object comprises projecting an object manipulation window in the first display unit, wherein the window replicates a projection of objects projected in the first display unit wherein the object manipulation window enables selecting a location for the projection of the designated object in the second display unit, and wherein the selecting of a location comprises dragging the designated object in the object manipulation window using a pointer device.

25. A method comprising the steps of:
enabling a designation of a non-active object projected in a first display unit connected to a first computer system; and
projecting the designated object as an object in a second display unit communicatively connected to the first computer system, wherein the designated object is projected as an active object in one of the first and second display units concurrently with the designated object being projected as a non-active object in the other display unit, wherein the designated object is projected as an active object in the second display unit concurrently with the designated object being projected as a non-active object in the first display unit, wherein the enabling of the designation of the non-active object comprises projecting an object manipulation window in the first display unit, wherein the window replicates a projection of objects projected in the first display unit wherein the object manipulation window enables selecting a location for the projection of the designated object in the second display unit, and wherein the object manipulation window enables selecting a size for the projection of the designated object in the second display unit.

26. The method of claim 25, wherein the selecting of a size comprises dragging an edge of the designated object in the object manipulation window using a pointer device.

27. A computer program on a computer usable medium having computer readable program code means comprising:
instructions for enabling a designation of an object, wherein the designated object is non-active in a first display unit connected to a first computer system; and
instructions for visibly displaying the designated object as an object in a second display unit communicatively connected to the first computer system, wherein the designated object is visibly displayed as an active object in one of the first and second display units concurrently with the designated object being visibly displayed as a non-active object in the other display unit.

28. The program code means of claim 27, wherein the designated object is visibly displayed as an active object in the second display unit concurrently with the designated object being visibly displayed as a non-active object in the first display unit.

29. The program code means of claim 28, wherein the designated object being visibly displayed as a non-active in the first display unit has at least a portion of the designated object bidden in the first display unit projection, and wherein the instructions for visibly displaying comprise instructions for visibly displaying as visible in the second display unit the at least portion of the designated object that is hidden in the first display unit projection.

30. The program code means of claim 29, wherein the designated object being visibly displayed as a non-active object in the second display unit is minimized in the first display unit.

31. The program code means of claim 29, wherein the designated object being visibly displayed as a non-active object in the second display unit is restored in the first display unit.

32. The program code means of claim 28, wherein the instructions for enabling the designation of the non-active object comprise instructions for providing a button associated with the object.

33. The program code means of claim 32, wherein instructions for providing the button comprise instructions for visibly displaying the button in the first display unit projection of the designated object.

34. The program code means of claim 28, wherein the instructions for enabling the designation of the non-active object comprise instructions for visibly displaying an object manipulation window in the first display unit, wherein the window replicates a projection of objects visibly displayed in the first display unit.

35. The program code means of claim 34, wherein the instructions for visibly displaying an object manipulation window comprise instructions for enabling selection of a location for the projection of the designated object in the second display unit.

36. The program code means of claim 27, wherein the designated object is visibly displayed as an active object in the first display unit concurrently with the designated object being visibly displayed as a non-active object in the second display unit.

37. A computer program on a computer usable medium having computer readable program code means comprising:
instructions for enabling a designation of an object, wherein the designated object is non-active in a first display unit connected to a first computer system; and
instructions for projecting the designated object as an object in a second display unit communicatively connected to the first computer system, wherein the designated object is projected as an active object in one of the first and second display units concurrently with the designated object being projected as a non-active object in the other display unit, wherein the designated object is projected as an active object in the second display unit concurrently wit the designated object being projected as a non-active object in the first display unit, wherein the instructions for enabling the designation of the non-active object comprise instructions for projecting an object manipulation window in the first display unit, wherein the window replicates a projection of objects projected in the first display unit, wherein the instructions for projecting an object manipulation window comprise instructions for enabling selection of a location for the projection of the designated object in the second display unit, and wherein the selecting of a location comprises dragging the designated object in the object manipulation window using a pointer device.

38. A computer program on a computer usable medium having computer readable program code means comprising:
instructions for enabling a designation of an object, wherein the designated object is non-active in a first display unit connected to a first computer system; and
instructions for projecting the designated object as an object in a second display unit communicatively connected to the first computer system, wherein the designated object is projected as an active object in one of the display units concurrently with the designated object being projected as a non-active object in the other display unit, wherein the designated object is projected as an active object in the second display unit concurrently with the designated object being projected as a non-active object in the first display unit, wherein the instructions for enabling the designation of the non-active object comprise instructions for projecting an object manipulation window in the first display unit, wherein the window replicates a projection of objects projected in the first display unit, wherein the instructions for projecting an object manipulation window comprise instructions for enabling selection of a location for the projection of the designated object in the second display unit, and wherein the instructions for projecting an object manipulation window comprise instructions for enabling selection of a size for the projection of the designated object in the second display unit.

39. The of claim 38, wherein the selecting of a size comprises dragging an edge of the designated object in the object manipulation window using a pointer device.

* * * * *